US008515197B2

United States Patent
Kao et al.

(10) Patent No.: US 8,515,197 B2
(45) Date of Patent: Aug. 20, 2013

(54) IMAGE RESOLUTION ENHANCING DEVICE AND METHOD FOR DISPLAY PANEL

(75) Inventors: Meng-Chao Kao, Taipei (TW);
Hsiang-Tan Lin, Keelung (TW);
Pei-Lin Hsieh, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 0 days.

(21) Appl. No.: 13/300,672

(22) Filed: Nov. 21, 2011

(65) Prior Publication Data
US 2013/0058572 A1 Mar. 7, 2013

(30) Foreign Application Priority Data
Sep. 5, 2011 (TW) .............................. 100131950 A

(51) Int. Cl.
*G06K 9/40* (2006.01)
(52) U.S. Cl.
USPC ............................ 382/254; 382/299; 382/300
(58) Field of Classification Search
USPC ................. 382/162, 167, 254, 255, 274, 298, 382/300, 299; 348/441, 452, 581, 582, 672, 348/E9.01, 222.1, E7.003
See application file for complete search history.

(56) References Cited

U.S. PATENT DOCUMENTS

| 6,661,429 | B1 | 12/2003 | Phan | |
| 6,904,166 | B2 * | 6/2005 | Hsia et al. | 382/162 |
| 7,215,347 | B2 | 5/2007 | Phan | |
| 7,583,860 | B2 * | 9/2009 | Kuo et al. | 382/300 |
| 8,331,710 | B2 * | 12/2012 | Kawase et al. | 382/254 |

FOREIGN PATENT DOCUMENTS

| CN | 1661658 | 8/2005 |
| JP | 2011182094 | 9/2011 |
| TW | 452757 | 9/2001 |

OTHER PUBLICATIONS

"First Office Action of China Counterpart Application", issued on Mar. 27, 2013, p1-p8, in which the listed references were cited.

\* cited by examiner

*Primary Examiner* — Anh Do
(74) *Attorney, Agent, or Firm* — Jianq Chyun IP Office

(57) ABSTRACT

An image resolution enhancing device and method for a display panel are provided. The image resolution enhancing method includes the following steps. Enlarge the image resolution of a first image to obtain a second image. Shrink the image resolution of the second image to obtain a third image. Implement a subtraction operation on the first image and the third image, so as to obtain a difference image. Enlarge the image resolution of the difference image to obtain an enhancing image. Implement an addition operation on the enhancing image and the second image, so as to obtain a fourth image with high image resolution.

20 Claims, 10 Drawing Sheets

IMAGE RESOLUTION ENHANCING DEVICE AND METHOD FOR DISPLAY PANEL

CROSS-REFERENCE TO RELATED APPLICATION

This application claims the priority benefit of Taiwan application serial no. 100131950, filed on Sep. 5, 2011. The entirety of the above-mentioned patent application is hereby incorporated by reference herein and made a part of this specification.

BACKGROUND OF THE INVENTION

1. Field of the Invention

The present invention relates to an image processing, and more particularly to an image resolution enhancing device and method.

2. Description of Related Art

Generally speaking, a pixel resolution of a display and a pixel resolution of an image to be displayed may be not consistent. For example, usually, the pixel resolution of the image is smaller than the pixel resolution of the display. Therefore, before the image is displayed, the pixel resolution of the image is converted to match the pixel resolution of the display to facilitate the following image output. Furthermore, the image needs to be enlarged or shrunk when being displayed on the display, so that the image resolution and the display resolution are not consistent and the conversion of the resolution is required beforehand. In the conventional arts, an interpolation method is adopted to solve the problem of inconsistent pixel resolutions, which calculates a corresponding pixel value of a pixel position of the display according to the pixel data of the image. Although currently many methods adopting the interpolation mechanism to solve the pixel resolution exist, the interpolation effect of the image still needs a lot of improvements. Therefore, it is a problem in need of solution how to convert the image resolution without influencing the image quality.

SUMMARY OF THE INVENTION

The present invention provides an image resolution enhancing device and method for a display panel, which can enhance the image resolution without increasing the signal source resolution and improve the problem that the image quality is decreased after the image resolution conversion.

The present invention provides an image resolution enhancing method for a display panel, which includes:
implementing an interpolation operation on a first image to generate a second image, in which a resolution of the second image is greater than a resolution of the first image;
sampling the second image to obtain a third image, in which a resolution of the third image is equal to the resolution of the first image;
implementing a subtraction operation on the first image and the third image to obtain a difference image;
implementing the interpolation operation on the difference image to generate an enhancing image, in which a resolution of the enhancing image is equal to the resolution of the second image; and
implementing an addition operation on the second image and the enhancing image to obtain a fourth image.

In an embodiment of the present invention, the resolution enhancing method further includes: implementing a sub-pixel arrangement on the fourth image.

In an embodiment of the present invention, the display panel is a Red, Green, Blue, White (RGBW) panel, and the fourth image includes a plurality of display pixels. Each display pixel includes a red sub-pixel, a green sub-pixel, a blue sub-pixel and a white sub-pixel, and the red sub-pixel, the green sub-pixel, the blue sub-pixel and the white sub-pixel are arranged in a square and respectively have corresponding display pixel data.

In an embodiment of the present invention, each display pixel data includes red sub-pixel data, green sub-pixel data and blue sub-pixel data, and the step of implementing the sub-pixel arrangement on the fourth image includes:
driving the red, green, blue sub-pixel in each display pixel respectively by sub-pixel data with a corresponding color in the display pixel data corresponding to the red, green, blue sub-pixel, and driving the white sub-pixel in each display pixel respectively by sub-pixel data with a lowest grayscale value in the corresponding display pixel data.

In an embodiment of the present invention, the first image includes a plurality of first pixels, the third image includes a plurality of third pixels, and the pixel data of each third pixel is an operation result obtained by implementing the interpolation operation on the pixel data of at least two neighbour first pixels.

In an embodiment of the present invention, the first image includes a plurality of first pixels, and the second images include the first pixels, a plurality of first interpolation pixels and a plurality of second interpolation pixel. The first interpolation pixels and the second interpolation pixels are obtained by implementing the interpolation operation on the first pixels, and each first interpolation pixel is respectively located between two nearest first pixels, each second interpolation pixel is respectively located at a center position of four nearest first pixels. The pixel data of each first interpolation pixel is an average value of the pixel data of two nearest first pixels, and the pixel data of each second interpolation pixel is an average value of the pixel data of four nearest first pixels.

In an embodiment of the present invention, the step of sampling the second image to obtain the third image includes:
sampling the second interpolation pixels in the second image to obtain the third image.

In an embodiment of the present invention, the step of implementing the subtraction operation on the first image and the third image includes:
subtracting the pixel data of the second interpolation pixels at the corresponding position in the third image from the pixel data of the first pixels respectively.

In an embodiment of the present invention, the difference image includes a plurality of difference pixels, and the enhancing images include the difference pixels, a plurality of third interpolation pixels and a plurality of fourth interpolation pixels. The third interpolation pixels and the fourth interpolation pixels are obtained by implementing the interpolation operation on the difference pixels, and each third interpolation pixel is respectively located between two nearest difference pixels, and each fourth interpolation pixel is respectively located at a center position of four nearest difference pixels. The pixel data of each third interpolation pixel is an average value of the pixel data of two nearest difference pixels, and the pixel data of each fourth interpolation pixel is an average value of the pixel data of four nearest difference pixels.

In an embodiment of the present invention, the step of implementing the addition operation on the second image and the enhancing image includes:

implementing an addition operation on the pixel data of the pixels in the second image respectively and the pixel data of the pixel at a corresponding position in the enhancing image.

The present invention also provides an image resolution enhancing device for a display panel, which includes:

a first interpolation operation unit, operable to implement an interpolation operation on a first image to generate a second image, in which a resolution of the second image is greater than a resolution of the first image;

a sampling unit, coupled to the first interpolation operation unit and operable to sample the second image to obtain a third image, in which a resolution of the third image is equal to the resolution of the first image;

a subtraction operation unit, coupled to the sampling unit and operable to implement a subtraction operation on the first image and the third image to obtain a difference image;

a second interpolation operation unit, coupled to the subtraction operation unit and operable to implement the interpolation operation on the difference image to generate an enhancing image, in which a resolution of the enhancing image is equal to the resolution of the second image; and an addition operation unit, coupled to the first interpolation operation unit and the second interpolation operation unit and operable to implement an addition operation on the second image and the enhancing image to obtain a fourth image.

In an embodiment of the present invention, the image resolution enhancing device further includes:

a sub-pixel arrangement unit, coupled to the addition operation unit and operable to implement a sub-pixel arrangement on the fourth image.

In an embodiment of the present invention, the sub-pixel arrangement unit further drives the red, green, blue sub-pixel in each display pixel respectively by sub-pixel data with a corresponding color in the display pixel data corresponding to the red, green, blue sub-pixel, and drives the white sub-pixel in each display pixel respectively by the sub-pixel data with a lowest grayscale value in the corresponding display pixel data.

In an embodiment of the present invention, the first image includes a plurality of first pixels, the third image includes a plurality of third pixels, and the pixel data of each third pixel is an operation result obtained by the first interpolation operation unit that implements the interpolation operation on the pixel data of at least two neighbour first pixels.

In an embodiment of the present invention, the first image includes a plurality of first pixels, and the second images include the first pixels, a plurality of first interpolation pixels and a plurality of second interpolation pixels. The first interpolation pixels and the second interpolation pixels are obtained by the first interpolation operation unit that implements the interpolation operation on the first pixels. Each first interpolation pixel is respectively located between two nearest first pixels, and each second interpolation pixel is respectively located at a center position of four nearest first pixels. The pixel data of each first interpolation pixel is an average value of the pixel data of two nearest first pixels, and the pixel data of each second interpolation pixel is an average value of the pixel data of four nearest first pixels.

In an embodiment of the present invention, the sampling unit further samples the second interpolation pixels in the second image to obtain the third image.

In an embodiment of the present invention, the subtraction operation unit further subtracts the pixel data of the second interpolation pixels at the corresponding position in the third image from the pixel data of the first pixels respectively.

In an embodiment of the present invention, the difference image includes a plurality of difference pixels, and the enhancing images include the difference pixels, a plurality of third interpolation pixels and a plurality of fourth interpolation pixels. The third interpolation pixels and the fourth interpolation pixels are obtained by the second interpolation operation unit that implements the interpolation operation on the difference pixels. Each third interpolation pixel is respectively located between two nearest difference pixels, and each fourth interpolation pixel is respectively located at a center position of four nearest difference pixels. The pixel data of each third interpolation pixel is an average value of the pixel data of two nearest difference pixels, and the pixel data of each fourth interpolation pixel is an average value of the pixel data of four nearest difference pixels.

In an embodiment of the present invention, the addition operation unit further implements an addition operation on the pixel data of the pixels in the second image respectively and the pixel data of the pixel at a corresponding position in the enhancing image.

Based on the above description, the present invention enlarges and then shrinks the image resolution of the first image, thereafter implements a subtraction operation on the original first image to obtain a difference image, and enlarges the resolution of the difference image to obtain an enhancing image. By implementing an addition operation on the enhancing image and the first image having the enlarged image resolution, the image resolution may be enhanced without increasing the signal source resolution and meanwhile the impact of the conversion of the image resolution on the image quality is greatly reduced.

To make the above characteristics and advantages of the present invention apparent, the embodiments are illustrated in the following paragraphs in accompanying with the drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
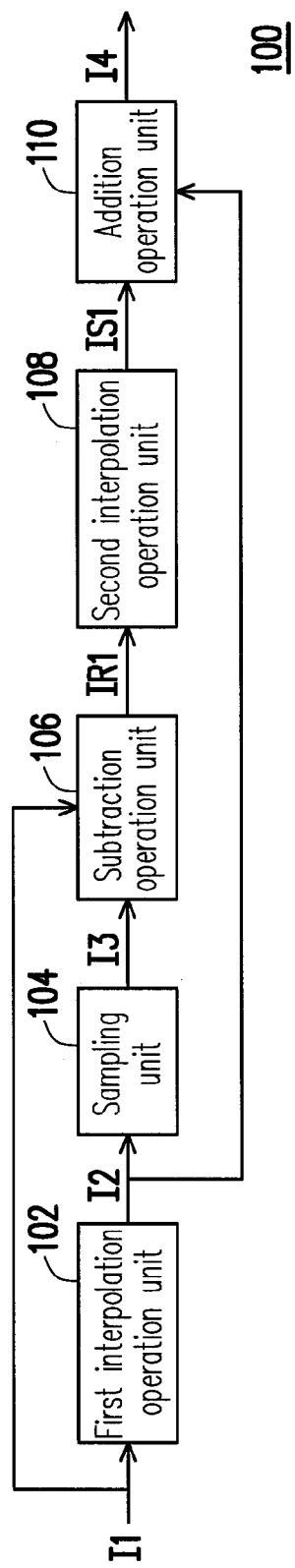
FIG. 1 is a schematic view illustrating an image resolution enhancing device for a display panel according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic view illustrating an image resolution enhancing device for a display panel according to an embodiment of the present invention. Referring to FIG. 1, the image resolution enhancing device 100 includes a first interpolation operation unit 102, a sampling unit 104, a subtraction operation unit 106, a second interpolation operation unit 108 and an addition operation unit 110. The sampling unit 104 is coupled to the first interpolation operation unit 102 and the subtraction operation unit 106, the second interpolation operation unit 108 is coupled to the subtraction operation unit 106 and the addition operation unit 110, and the addition operation unit 110 is further coupled to the first interpolation operation unit 102.

Figure 2A:
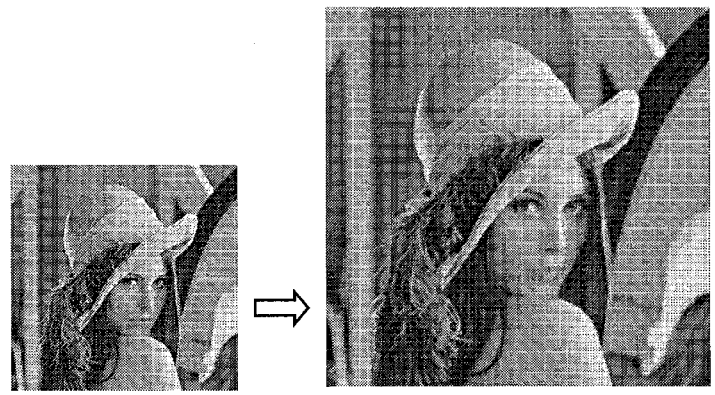
FIG. 2A is a schematic view of enlarging a resolution of a first image.

The first interpolation operation unit 102 is operable to receive a first image I1 and implement an interpolation operation on the first image I1 to enlarge the resolution so as to obtain a second image I2. FIG. 2A is a schematic view of enlarging a resolution of a first image I1. In FIG. 2A, the first image I1 is assumed to be an image signal adapted for a display panel with a resolution of Quarter Video Graphics Array (QVGA). In this embodiment, the first interpolation operation unit 102 converts the image signal into an image signal with a higher resolution of Video Graphics Array (VGA) through an interpolation operation. That is to say, after being converted by the first interpolation operation unit 102, the resolution of the first image I1 is enlarged by 4 times.

The first image I1 includes a plurality of first pixels, and the second image I2 further includes a plurality of first interpolation pixels and a plurality of second interpolation pixels generated by the interpolation operation in addition to the plurality of first pixels of the original first image I1. Each first interpolation pixel is respectively located between two nearest first pixels, and each second interpolation pixel is respectively located at a center position of four nearest first pixels.

Figure 2B:
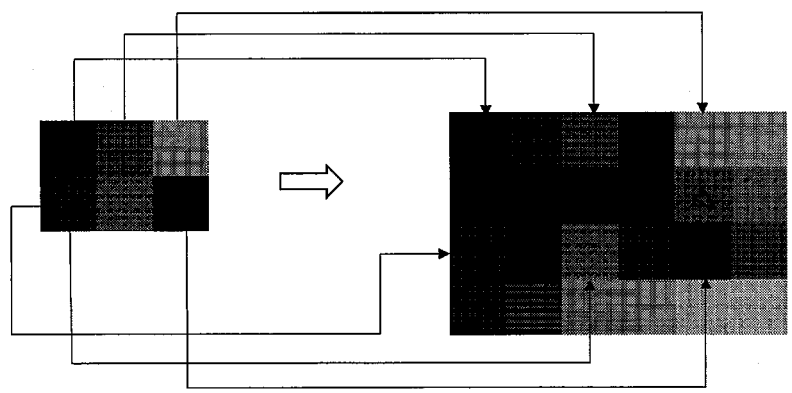
FIG. 2B is a schematic view illustrating pixel interpolation of the first image.

FIG. 2B is a schematic view illustrating pixel interpolation of the first image. In FIG. 2B, the left image is assumed to be the first image I1 formed by the first pixels, and the right image is assumed to be the second image I2 formed by the first pixels, the first interpolation pixels and the second interpolation pixels. The pixels indicated by a triangle symbol are the first interpolation pixels, the pixel data of each first interpolation pixel is an average value of the pixel data of two nearest first pixels. The pixels indicated by a star symbol is the second interpolation pixel, and the pixel data of each second interpolation pixel is an average value of the pixel data of four nearest first pixels.

Figure 3A:
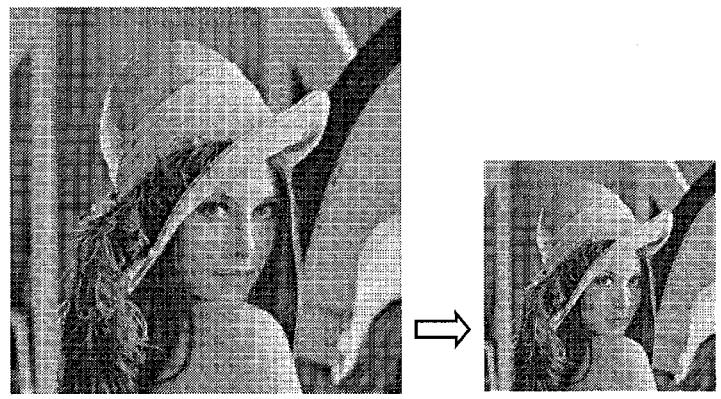
FIG. 3A is a schematic view of shrinking a resolution of a second image.
Figure 3B:
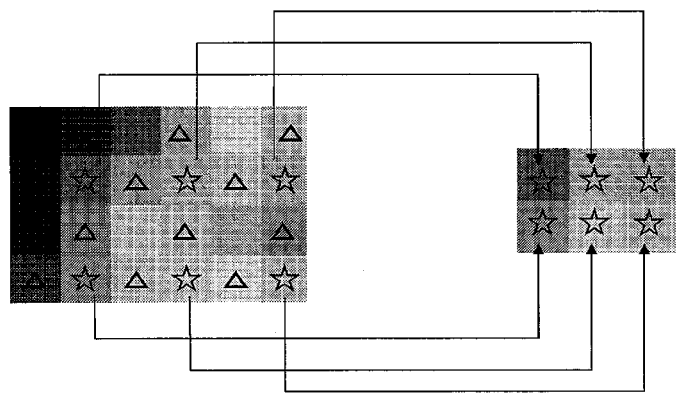
FIG. 3B is a schematic view illustrating sampling of the second image.

The sampling unit 104 is operable to sample the second image I2, so as to shrink the first image I1 with the resolution enlarged back to the original resolution to obtain a third image I3. As shown in FIG. 3A, the second image I2 with the resolution of VGA after being sampled by the sampling unit 104 is converted back to the image signal (that is, the third image I3) with the resolution of QVGA. The pixel sampled by the sampling unit 104 is an operation result obtained by the first interpolation operation unit 102 that implements the interpolation operation on the pixel data of at least two neighbour first pixels. As shown in FIG. 3B, the left image is the second image I2 obtained by the first interpolation operation unit 102 that implements interpolation operation on the first image I1, and the right image is the third image I3 obtained by the sampling unit 104 that samples the second image I2. The pixels sampled by the sampling unit 104 are all indicated by star symbols.

Figure 4A:
FIG. 4A, 4B are schematic views illustrating a subtraction operation of the first image and the third image.
Figure 4B:

The subtraction operation unit 106 is operable to implement a subtraction operation on the first image I1 and the third image I3, so as to obtain a difference image IR1. As shown in FIG. 4A, the subtraction operation unit 106 subtracts the third image I3 from the first image I1 to obtain a difference image IR1. The difference image IR1 includes the image detail differences between the first image I1 and the third image I3. In specific, the subtraction operation implemented on the first image I1 and the third image I3 is shown in FIG. 4B, and the subtraction operation unit 106 subtracts the pixel data of the second interpolation pixels at a corresponding position in the third image I3 from the pixel data of the first pixels respectively.

Figure 5A:
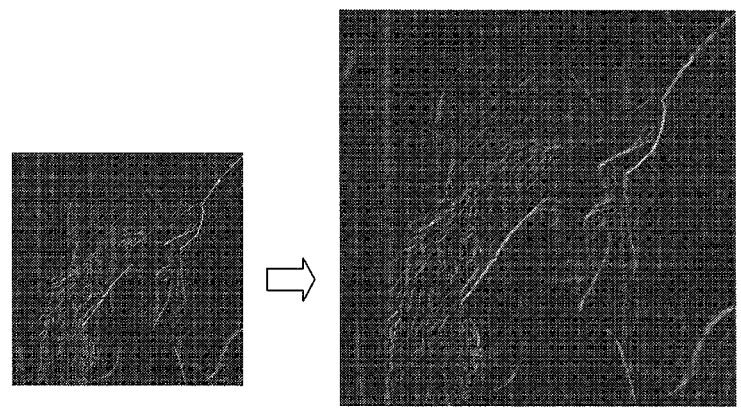
FIG. 5A is a schematic view of enlarging a resolution of a difference image.

The second interpolation operation unit 108 is operable to implement an interpolation operation on the difference image IR1 to enlarge the resolution of the difference image IR1, so as to generate an enhancing image IS1. The resolution of the enhancing image IS1 is equal to the resolution of the second image I2. FIG. 5A is a schematic view of enlarging a resolution of a difference image. In FIG. 5A, the difference image IR1 with the original resolution of QVGA after the interpolation operation implemented by the second interpolation operation unit 108 is converted into the enhancing image IS1 with the resolution of VGA.

The difference image includes a plurality of difference pixels, and the enhancing image IS1 further includes a plurality of third interpolation pixels and a plurality of fourth interpolation pixels generated by the interpolation operation in addition to the plurality of difference pixels of the original difference image. Each third interpolation pixel is respectively located between two nearest difference pixels, and each fourth interpolation pixel is respectively located at a center position of four nearest difference pixels.

Figure 5B:
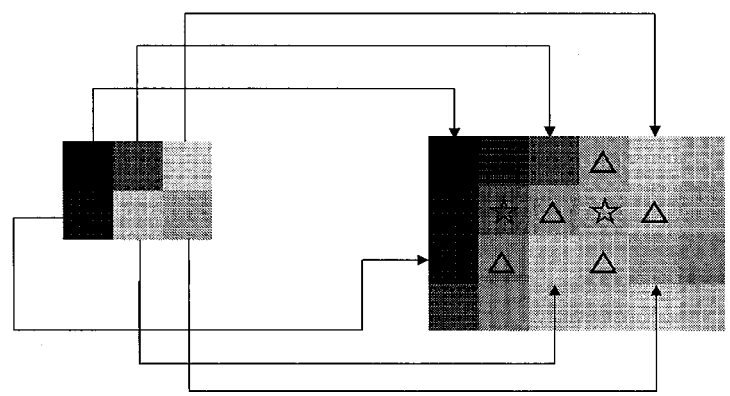
FIG. 5B is a schematic view illustrating pixel interpolation of the difference image.

In specific, the interpolation operation method of the second interpolation operation unit 108 is the same as that of the first interpolation operation unit 102. In the schematic view of pixel interpolation of FIG. 5B, the left image is the difference image formed by difference pixels, and the right image is the enhancing image IS1 formed by the difference pixels, the third interpolation pixels and the fourth interpolation pixels. The pixel indicated by a triangle symbol is the third interpolation pixel, and the pixel data of each third interpolation pixel is an average value of the pixel data of two nearest difference pixels. The pixel indicated by a star symbol is the fourth interpolation pixel, and the pixel data of each fourth interpolation pixel is an average value of the pixel data of four nearest difference pixels.

The addition operation unit 110 is operable to implement an addition operation on the second image I2 and the enhancing image IS1 to obtain a fourth image I4. As shown in FIG.

Figure 6A:
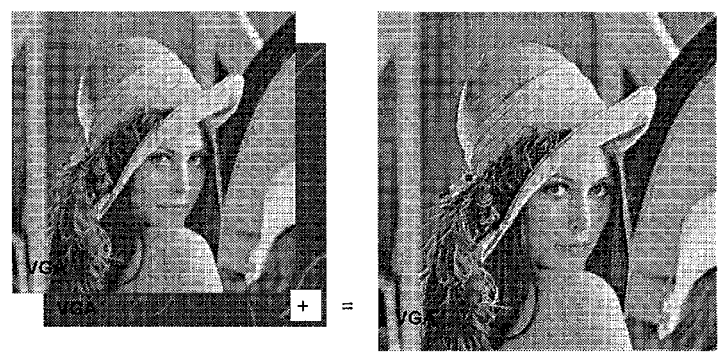
FIG. 6A, 6B are schematic views illustrating an addition operation on the difference image and an enhancing image.
Figure 6B:

6A, the addition operation unit 110 implements an addition operation on the second image I2 and the enhancing image IS1 to obtain a fourth image I4. As the enhancing image is obtained by the difference image IR1 with the resolution enlarged in the interpolation operation, the enhancing image includes the image details that the second image does not include. By implementing an addition operation on the second image I2 and the enhancing image IS1, the second image I2 with the resolution enlarged is meticulous in presenting the image details and has a better image quality. In specific, the addition operation on the second image I2 and the enhancing image IS1 may refer to FIG. 6B. The addition operation unit 110 implements an addition operation on the pixel data of the pixels in the second image respectively and the pixel data of the pixel at a corresponding position in the enhancing image.

It should be noted that the interpolation operation disclosed in the above embodiments are exemplary and are not limited to this in practice. For example, a group of more first pixels may be adopted in the interpolation operation or the resolution of the first image I1 may be enlarged by another interpolation operation method. In addition, the object sampled by the sampling unit 104 is not limited to the second interpolation pixels, and other interpolation operation results, for example, the first interpolation pixels indicated by triangle symbols may be obtained by sampling.

Figure 7:
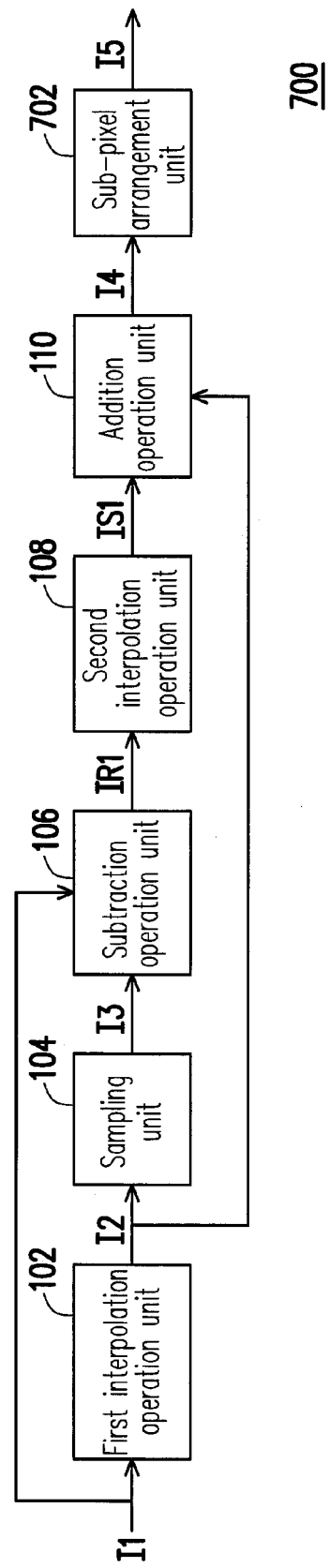
FIG. 7 is a schematic view illustrating an image resolution enhancing device for a display panel according to another embodiment of the present invention.

FIG. 7 is a schematic view illustrating an image resolution enhancing device for a display panel according to another embodiment of the present invention. Referring to FIG. 7, the difference between the image resolution enhancing device 700 of this embodiment and the image resolution enhancing device 100 in FIG. 1 lies in that the image resolution enhancing device 700 of this embodiment further includes a sub-pixel arrangement unit 702 coupled to the addition operation unit 110. The sub-pixel arrangement unit 702 is operable to implement the sub-pixel arrangement on the fourth image I4. When the image resolution enhancing device is applied in the display panel having a particular pixel arrangement, the sub-pixel arrangement unit 702 of the image resolution enhancing device 700 of this embodiment may be operable to implement the sub-pixel arrangement on the fourth image I4 to output a fifth image I5, so as to output the corresponding sub-pixel data directed for different sub-pixels of the display panel, thereby enhancing the image quality of the display image of display panel.

Figure 8:
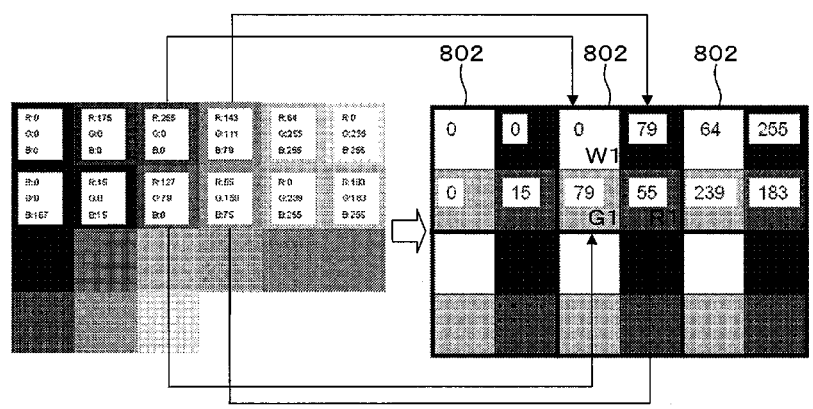
FIG. 8 is a schematic view illustrating a sub-pixel arrangement of a fourth image.

For example, the image resolution enhancing device 700 of this embodiment is assumed to be applied in an RGBW panel. The fourth image I4 displayed on the RGBW panel includes a plurality of display pixels. Each display pixel includes a red sub-pixel, a green sub-pixel, a blue sub-pixel and a white sub-pixel, and the red sub-pixel, the green sub-pixel, the blue sub-pixel and the white sub-pixel are arranged in a square and respectively have corresponding display pixel data. In the schematic view of sub-pixel arrangement of the FIG. 8, each sub-pixel is corresponding to display pixel data, and in this embodiment, the display pixel data is 24-bit data and includes 8-bit red sub-pixel data R, 8-bit green sub-pixel data G and 8-bit blue sub-pixel data B.

The red, green, blue sub-pixel R1, G1, B1 in the display pixel 802 are respectively driven by the red, green, blue sub-pixel data R, G, B in corresponding display pixel data, and the white sub-pixel W1 is driven by the sub-pixel data with the lowest grayscale value among the three pieces of sub-pixel data R, G, B having different colors in corresponding display pixel data. For example, in the right image of FIG. 8, the grayscale values of the red, green, blue sub-pixel data R, G, B in the display pixel data corresponding to the red sub-pixel R1 in the second display pixel respectively are 55, 159, 75, so the red sub-pixel R1 is displayed by the grayscale value (55) of the red sub-pixel data R. Likewise, the grayscale values of the red, green, blue sub-pixel data R, G, B in the display pixel data corresponding to the green sub-pixel G1 respectively are 127, 79, 0, so the green sub-pixel G1 is displayed by the grayscale value (79) of the green sub-pixel data G. The blue sub-pixel B1 deduced in the same way is displayed by the grayscale value (79) of the blue sub-pixel data B in the corresponding display pixel data. In addition, the grayscale values of the red, green, blue sub-pixel data R, G, B in the display pixel data corresponding to the white sub-pixel W1 respectively are 255, 0, 0, so the white sub-pixel W1 is displayed by the lowest grayscale value (0) of the red, green, blue sub-pixel data R, G, B.

Figure 9:
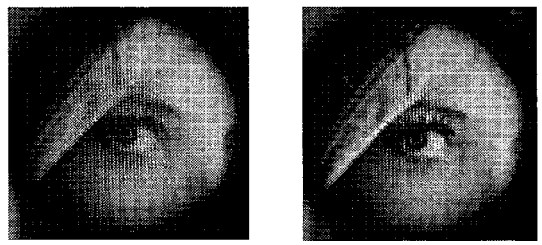
FIG. 9 is a schematic view of an image having the image resolution before modification and the image resolution enlarged in the embodiment of FIG. 7.

FIG. 9 is a schematic view of an image having the image resolution before modification and the image resolution enlarged in the embodiment of FIG. 7. The left image of FIG. 9 is a schematic view illustrating a part of the image having the original resolution, and the right image is a schematic view illustrating a part of the fifth image I5 obtained by the image resolution enhancing device 700 of FIG. 7. It can be seen from FIG. 9 that the detail presentation and contrast of the image obtained by the image resolution enhancing device 700 of this embodiment is much better than those of the prior arts.

Figure 10:
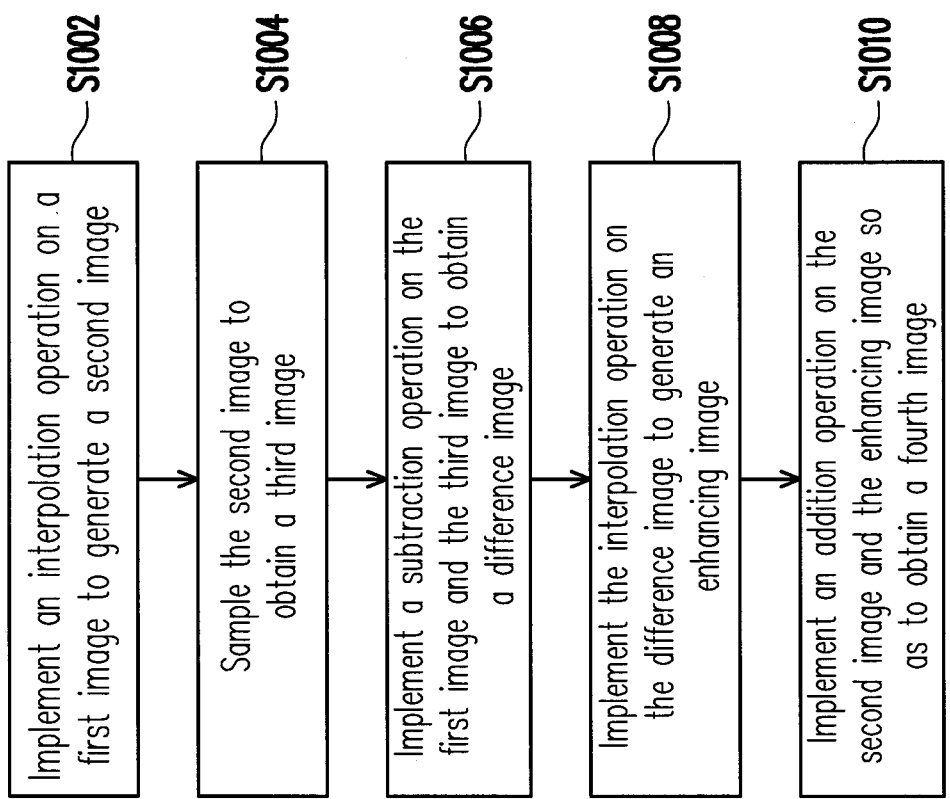
FIGS. 10 and 11 are flow charts illustrating an image resolution enhancing method according to an embodiment of the present invention.

FIG. 10 is a flow chart illustrating an image resolution enhancing method according to an embodiment of the present invention. Referring to FIG. 10, the image resolution enhancing method of the image resolution enhancing device may include the following steps. Firstly, an interpolation operation is implemented on a first image to generate a second image (step S1002), in which a resolution of the second image is greater than a resolution of the first image. Then, the second image is sampled to obtain a third image (step S1004), in which the first image includes a plurality of first pixels, the third image includes a plurality of third pixels, the pixel data of each third pixel is an operation result obtained by implementing the interpolation operation on the pixel data of at least two neighbour first pixels. In addition, a resolution of the third image is equal to the resolution of the first image. Thereafter, a subtraction operation is implemented on the first image and the third image to obtain a difference image (step S1006), in which the difference image includes the image detail differences between the first image and the third image. Afterwards, the interpolation operation is implemented on the difference image to generate an enhancing image (step S1008), in which a resolution of the enhancing image is equal to the resolution of the second image. Finally, an addition operation is implemented on the second image and the enhancing image, so as to obtain a fourth image (step S1010). As the enhancing image is obtained by the difference image with the resolution enlarged by the interpolation operation, the enhancing image includes the image details that the second image does not include. By implementing an addition operation on the second image and the enhancing image, the second image with the resolution enlarged is meticulous in presenting the image details and has a better image quality.

Figure 11:
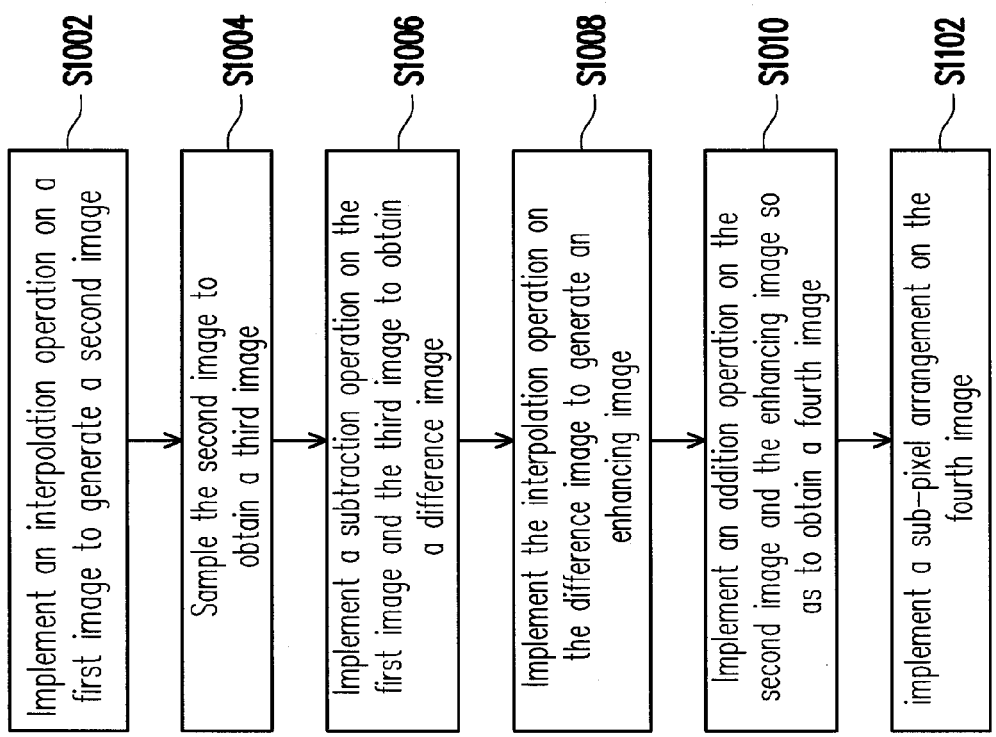

In addition, when the image resolution enhancing method is applied in the display panel with a particular pixel arrangement, the flow chart of the image resolution enhancing method may refer to FIG. 11. The difference between the flow charts of the image resolution enhancing method of FIG. 11 and FIG. 10 lies in that after step S1010 in the embodiment of FIG. 11, a sub-pixel arrangement is further implemented on the fourth image (step S1102), so as to enhance the image quality of the display image of the display panel. For example, when being applied in the RGBW panel, the red, green, blue sub-pixel in each display pixel may be respectively driven by sub-pixel data with a corresponding color in the display pixel data corresponding to the red, green, blue sub-pixel, and the white sub-pixel in each display pixel is respectively driven by the sub-pixel data with the lowest grayscale value in the corresponding display pixel data. In this manner, the display quality of the RGBW panel may be greatly enhanced.

In view of the above, the present invention enlarges and then shrinks the image resolution of the first image, thereafter implements a subtraction operation on the original first image to obtain a difference image, and enlarges the resolution of the difference image to obtain an enhancing image. By implementing an addition operation on the enhancing image and the first image having the enlarged image resolution, the image resolution may be enhanced without increasing the signal source resolution and meanwhile the impact of the conversion of the image resolution on the image quality is greatly reduced. In addition, by implementing the sub-pixel arrangement on the fourth image for application in the panel with a particular pixel arrangement, for example, an RGBW panel using the chessboard shape arrangement, the image resolution of the RGBW panel may be enhanced and meanwhile the present invention further has the advantages of improving the panel brightness and reducing the power consumption.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image resolution enhancing method for a display panel, comprising:
    implementing an interpolation operation on a first image by a first interpolation operation unit to generate a second image, wherein a resolution of the second image is greater than a resolution of the first image;
    sampling the second image by a sampling unit to obtain a third image, wherein a resolution of the third image is equal to the resolution of the first image;
    implementing a subtraction operation on the first image and the third image by a subtraction operation unit to obtain a difference image;
    implementing the interpolation operation on the difference image by a second interpolation operation unit to generate an enhancing image, wherein a resolution of the enhancing image is equal to the resolution of the second image; and
    implementing an addition operation on the second image and the enhancing image by an addition operation unit to obtain a fourth image.

2. The image resolution enhancing method according to claim 1, further comprising:
    implementing a sub-pixel arrangement on the fourth image by a sub-pixel arrangement unit.

3. The image resolution enhancing method according to claim 2, wherein the display panel is a Red, Green, Blue, White (RGBW) panel, the fourth image comprises a plurality of display pixels, wherein each display pixel comprises a red sub-pixel, a green sub-pixel, a blue sub-pixel and a white sub-pixel, and the red sub-pixel, the green sub-pixel, the blue sub-pixel and the white sub-pixel are arranged in a square and respectively comprise corresponding display pixel data.

4. The image resolution enhancing method according to claim 3, wherein each display pixel data comprises red sub-pixel data, green sub-pixel data and blue sub-pixel data, and the step of implementing the sub-pixel arrangement on the fourth image comprises:
    driving the red sub-pixel, the green sub-pixel, the blue sub-pixel in each display pixel respectively by sub-pixel data with a corresponding color in the corresponding display pixel data corresponding to the red sub-pixel, the green sub-pixel, the blue sub-pixel by the sub-pixel arrangement unit, and driving the white sub-pixel in each display pixel respectively by sub-pixel data with a lowest grayscale value in the corresponding display pixel data by the sub-pixel arrangement unit.

5. The image resolution enhancing method according to claim 1, wherein the first image comprises a plurality of first pixels, the third image comprises a plurality of third pixels, the pixel data of each third pixel is an operation result obtained by implementing the interpolation operation on the pixel data of at least two neighbour first pixels.

6. The image resolution enhancing method according to claim 1, wherein the first image comprises a plurality of first pixels, the second images comprise the first pixels, a plurality of first interpolation pixels and a plurality of second interpolation pixels, wherein the first interpolation pixels and the second interpolation pixels are obtained by implementing the interpolation operation on the first pixels by the first interpolation operation unit, and each first interpolation pixel is respectively located between two nearest first pixels, each second interpolation pixel is respectively located at a center position of four nearest first pixels, wherein the pixel data of each first interpolation pixel is an average value of the pixel data of two nearest first pixels, and the pixel data of each second interpolation pixel is an average value of the pixel data of four nearest first pixels.

7. The image resolution enhancing method according to claim 6, wherein the step of sampling the second image to obtain the third image comprises:
    sampling the second interpolation pixels in the second image by the sampling unit to obtain the third image.

8. The image resolution enhancing method according to claim 6, wherein the step of implementing the subtraction operation on the first image and the third image comprises:
    subtracting the pixel data of the second interpolation pixels at the corresponding position in the third image from the pixel data of the first pixels respectively by the subtraction operation unit.

9. The image resolution enhancing method according to claim 1, wherein the difference image comprises a plurality of difference pixels, the enhancing images comprise the difference pixels, a plurality of third interpolation pixels and a plurality of fourth interpolation pixels, wherein the third interpolation pixels and the fourth interpolation pixels are obtained by implementing the interpolation operation on the difference pixels by the second interpolation operation unit, and each third interpolation pixel is respectively located between two nearest difference pixels, each fourth interpolation pixel is respectively located at a center position of four nearest difference pixels, wherein the pixel data of each third interpolation pixel is an average value of the pixel data of two nearest difference pixels, and the pixel data of each fourth interpolation pixel is an average value of the pixel data of four nearest difference pixels.

10. The image resolution enhancing method according to claim 1, wherein the step of implementing the addition operation on the second image and the enhancing image further comprises:

implementing an addition operation on the pixel data of the pixels in the second image respectively and the pixel data of the pixel at a corresponding position in the enhancing image by the addition operation unit.

11. An image resolution enhancing device for a display panel, comprising:
  a first interpolation operation unit, operable to implement an interpolation operation on a first image to generate a second image, wherein a resolution of the second image is greater than a resolution of the first image;
  a sampling unit, coupled to the first interpolation operation unit and operable to sample the second image to obtain a third image, wherein a resolution of the third image is equal to the resolution of the first image;
  a subtraction operation unit, coupled to the sampling unit and operable to implement a subtraction operation on the first image and the third image to obtain a difference image;
  a second interpolation operation unit, coupled to the subtraction operation unit and operable to implement the interpolation operation on the difference image to generate an enhancing image, wherein a resolution of the enhancing image is equal to the resolution of the second image; and
  an addition operation unit, coupled to the first interpolation operation unit and the second interpolation operation unit and operable to implement an addition operation on the second image and the enhancing image to obtain a fourth image.

12. The image resolution enhancing device according to claim 11, further comprising:
  a sub-pixel arrangement unit, coupled to the addition operation unit and operable to implement a sub-pixel arrangement on the fourth image.

13. The image resolution enhancing device according to claim 12, wherein the display panel is a Red, Green, Blue, White (RGBW) panel, the fourth image comprises a plurality of display pixels, wherein each display pixel comprises a red sub-pixel, a green sub-pixel, a blue sub-pixel and a white sub-pixel, and the red sub-pixel, the green sub-pixel, the blue sub-pixel and the white sub-pixel are arranged in a square and respectively comprise corresponding display pixel data.

14. The image resolution enhancing device according to claim 13, wherein the sub-pixel arrangement unit further drives the red sub-pixel, the green sub-pixel, the blue sub-pixel in each display pixel respectively by sub-pixel data with a corresponding color in the display pixel data corresponding to the red sub-pixel, the green sub-pixel, the blue sub-pixel, and drives the white sub-pixel in each display pixel respectively by sub-pixel data with a lowest grayscale value in the corresponding display pixel data.

15. The image resolution enhancing device according to claim 11, wherein the first image comprises a plurality of first pixels, the third image comprises a plurality of third pixels, the pixel data of each third pixel is an operation result obtained by the first interpolation operation unit that implements the interpolation operation on the pixel data of at least two neighbour first pixels.

16. The image resolution enhancing device according to claim 11, wherein the first image comprises a plurality of first pixels, the second images comprise the first pixels, a plurality of first interpolation pixels and a plurality of second interpolation pixels, wherein the first interpolation pixels and the second interpolation pixels are obtained by the first interpolation operation unit that implements the interpolation operation on the first pixels, and each first interpolation pixel is respectively located between two nearest first pixels, each second interpolation pixel is respectively located at a center position of four nearest first pixels, wherein the pixel data of each first interpolation pixel is an average value of the pixel data of two nearest first pixels, and the pixel data of each second interpolation pixel is an average value of the pixel data of four nearest first pixels.

17. The image resolution enhancing device according to claim 16, wherein the sampling unit further samples the second interpolation pixels in the second image to obtain the third image.

18. The image resolution enhancing device according to claim 16, wherein the subtraction operation unit further subtracts the pixel data of the second interpolation pixels at the corresponding position in the third image from the pixel data of the first pixels respectively.

19. The image resolution enhancing device according to claim 11, wherein the difference image comprises a plurality of difference pixels, the enhancing images comprise the difference pixels, a plurality of third interpolation pixels and a plurality of fourth interpolation pixels, wherein the third interpolation pixels and the fourth interpolation pixels are obtained by the second interpolation operation unit that implements the interpolation operation on the difference pixels, and each third interpolation pixel is respectively located between two nearest difference pixels, each fourth interpolation pixel is respectively located at a center position of four nearest difference pixels, wherein the pixel data of each third interpolation pixel is an average value of the pixel data of two nearest difference pixels, and the pixel data of each fourth interpolation pixel is an average value of the pixel data of four nearest difference pixels.

20. The image resolution enhancing device according to claim 11, wherein the addition operation unit further implements an addition operation on the pixel data of the pixels in the second image respectively and the pixel data of the pixel at a corresponding position in the enhancing image.

* * * * *